(12) United States Patent
Haslam et al.

(10) Patent No.: US 11,724,590 B2
(45) Date of Patent: Aug. 15, 2023

(54) FUEL TRANSACTION VERIFICATION

(71) Applicant: TF TECHNOLOGIES, LLC, Salt Lake City, UT (US)

(72) Inventors: Mark Haslam, Bountiful, UT (US); Max Fuller, Ooltewah, TN (US)

(73) Assignee: TF TECHNOLOGIES, LLC, Salt Lake City, UT (US)

( * ) Notice: Subject to any disclaimer, the term of this patent is extended or adjusted under 35 U.S.C. 154(b) by 232 days.

(21) Appl. No.: 17/296,708

(22) PCT Filed: Nov. 5, 2019

(86) PCT No.: PCT/US2019/059745
§ 371 (c)(1),
(2) Date: May 25, 2021

(87) PCT Pub. No.: WO2020/142136
PCT Pub. Date: Jul. 9, 2020

(65) Prior Publication Data
US 2022/0048379 A1  Feb. 17, 2022

Related U.S. Application Data (60) Provisional application No. 62/787,691, filed on Jan. 2, 2019.

(51) Int. Cl.
*B60K 15/03* (2006.01)

(52) U.S. Cl.
CPC ...... *B60K 15/03* (2013.01); *B60K 2015/0319* (2013.01); *B60K 2015/03197* (2013.01); *B60K 2015/03203* (2013.01); *B60K 2015/03217* (2013.01)

(58) Field of Classification Search
CPC .......... B60K 15/03; B60K 2015/03217; B60K 2015/0319; B60K 2015/03197; B60K 2015/03203
See application file for complete search history.

(56) References Cited

U.S. PATENT DOCUMENTS 11,085,805 B2 *  8/2021  Stevenson ............ G06Q 20/085
2018/0012204 A1  1/2018  Shetty et al.

FOREIGN PATENT DOCUMENTS

| RU | 2006136876 A  | 4/2008 |
| RU | 2331048 C2    | 8/2008 |
| WO | 2014200578 A2 | 12/2014 |

* cited by examiner

*Primary Examiner* — Jacob M Amick
(74) *Attorney, Agent, or Firm* — Steven L. Nichols; Fabian VanCott (57) ABSTRACT

In one example in accordance with the present disclosure, a method is described. According to the method, an actual volume of fuel added to at least one fuel tank is determined. It is also determined, an amount of fuel indicated as having been added to the fuel tank from a refueling station. The actual volume added is compared to the amount of fuel indicated as having been added to determine a difference between the two values.

20 Claims, 5 Drawing Sheets

FUEL TRANSACTION VERIFICATION

BACKGROUND

Various pieces of equipment, including vehicles, use liquid fuel as a fuel source. Some organizations have large quantities of equipment and/or vehicles, and fuel costs are a significant portion of their operating budget. Accordingly, such organizations, as well as a variety of other users, may take great care in tracking use and management of their fuel use.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The present specification describes a method and system for determining if a discrepancy exists between an actual amount added to a fuel tank and an amount of fuel indicated as having been added. A discrepancy between a recorded amount added and an actual amount added may result in a loss of money to an organization. For example, assume a record shows that 10.5 gallons of fuel were pumped and paid for, but that only 10 gallons were actually added to the fuel tank. In this example, the organization is paying for an extra 0.5 gallons worth of fuel that they did not actually receive. When considered across a fleet of vehicles, such cost may significantly affect the ability of an organization to operate. Whether such a discrepancy is a result of malfeasance or is merely unintentional, it is in an organization's best interest to be aware of such a discrepancy such that remedial measures may be carried out.

Specifically, the present specification describes a method. According to the method, an actual volume of fuel added to at least one fuel tank is determined as is an amount of fuel indicated, or recorded, as having been added to the fuel tank from a refueling station. The actual volume of fuel added is compared to the amount of fuel indicated as having been added to determine a difference between the two values.

The present specification also describes a system. The system includes an actual volume determiner to determine an actual volume of fuel added to at least one fuel tank and a recorded volume determiner to determine an amount of fuel indicated as having been added to the at least one fuel tank from a refueling station. The system also includes a volume comparator to compare the actual volume of fuel added against the amount of fuel indicated as having been added to determine a difference between the two.

The present specification also describes a tangible machine-readable storage medium encoded with instructions executable by a processor. The machine-readable storage medium includes instructions to 1) determine an initial fuel depth in a fuel tank, 2) convert the initial fuel depth to an initial fuel volume, 3) determine a final fuel depth in the fuel tank following a refueling operation, 4) convert the final fuel depth to a final fuel volume, and 5) determine from the initial fuel volume and the final fuel volume, a volume of fuel added during the refueling operation. The machine-readable storage medium also includes instructions to 1) transmit, to a remote location, the volume of fuel added during the refueling operation, 2) receive, at the remote location, an amount of fuel indicated as having been added to the fuel tank, and 3) compare the volume of fuel added against the amount of fuel indicated as having been added. The machine-readable storage medium also includes instructions to, when a difference between the volume of fuel added and the amount of fuel indicated as having been added is greater than a threshold amount, provide a notification of the difference.

In summary, using such a fuel transaction verification system and method 1) allows for increased information regarding fuel purchase and use for a variety of devices that consume fuel; 2) allows for more effective management of fuel purchase and use, and 3) notifies an equipment operator of issues relating to fuel purchase and use.

As used in the present specification and in the appended claims, the term "liquid fuel" or "fuel" refers to a variety of fuel types such as gasoline and diesel fuel.

Figure 1:
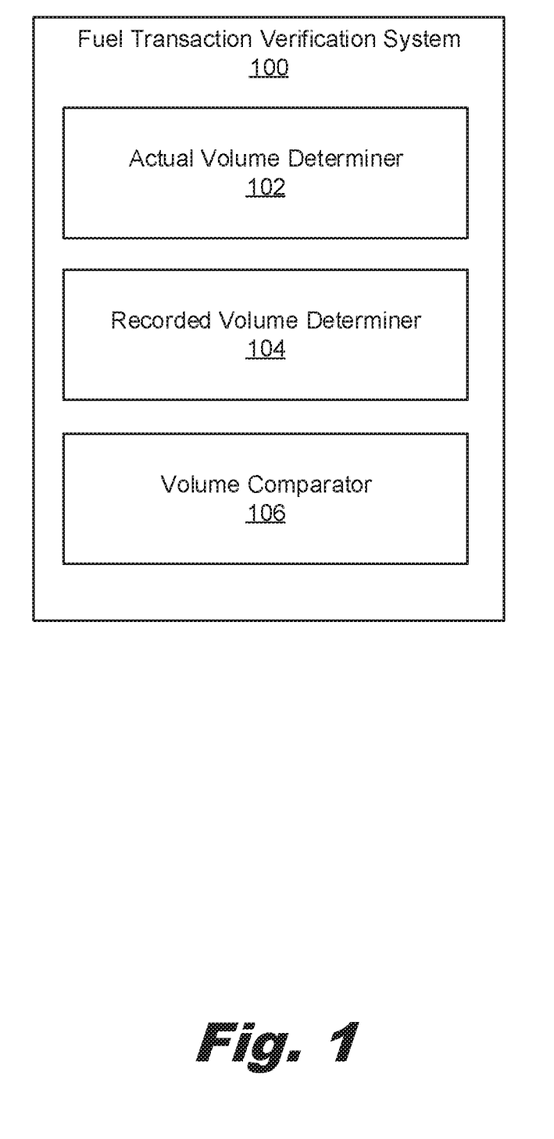
FIG. 1 is a block diagram of a system for fuel transaction verification, according to an example of the principles described herein.

Turning now to the figures, FIG. 1 is a block diagram of a system (100) for fuel transaction verification, according to an example of the principles described herein. As described above, the fuel transaction verification system (100) is used to ensure that a fuel amount indicated—by a fuel provider for example—as having been added matches the actual amount of fuel that has been added to a fuel tank. A discrepancy between the two may result in a loss of revenue to a company which, given the millions spent on fuel during a year for certain organizations such as a shipping fleet, may represent hundreds of thousands of dollars.

Accordingly, the fuel transaction verification system (100) includes an actual volume determiner (102) to determine an actual volume of fuel added to at least one fuel tank. For example, a fuel tank on a vehicle may be equipped with a fuel level sensor. The fuel level sensor may measure a level of fluid within a fuel tank and send a measurement value to the actual volume determiner (102). The actual volume determiner (102) can then convert the level of fuel, which may be indicated as a depth of fuel, into a volume of fuel. Such measurements may be taken before a refueling operation and after a refueling operation. Accordingly, the actual volume determiner (102) determines an initial fuel level/volume and a final fuel level/volume. From these initial and final values, it can be determined how much fuel has been added to the fuel tank.

A recorded volume determiner (104) of the fuel transaction verification system (100) determines an amount of fuel indicated as having been added to the at least one fuel tank from a refueling station. That is, the refueling equipment at a refueling station may indicate how much fuel has been pumped from the refueling tanks to a fuel tank on a vehicle. There are various ways that the amount of fuel indicated as having been added may be provided. In a first example, the fuel provider itself may supply the information. That is, the operator of the refueling station may send the information to the recorded volume determiner (104). In another example, a financial institution may provide the information. That is, a financial institution may record the transaction, which record indicates the value of the purchase and the quantity purchased. In this example, the financial institution may transmit the information to the recorded volume determiner (104).

The volume comparator (106) compares the two values, e.g., the actual volume added to the fuel tank and the volume indicated as having been added to the fuel tank. Such a comparator (106) may operate to compare the two volumetric values and determine a difference therebetween. The difference between the two volumes could be indicative of any variety of issues, of which a fleet manager would be interested in knowing about. Accordingly, the output of the volume comparator (106) may be provided as a notice to the operator of the vehicle, or a manager of a fleet of which the vehicle is a part of, such that remedial action may be taken.

While specific reference is made to determining an actual volume of fluid added to a single fluid tank and determining an amount indicated as having been added to a single fluid tank, the same principles apply to multiple fluid tanks. That is some vehicles, such as semi-trucks, include multiple fuel tanks. Accordingly, in this example, the actual volume determiner (102) determines an actual volume of fuel added to multiple fuel tanks and the recorded volume determiner (104) determines an amount of fuel indicated as having been added to multiple fuel tanks.

In some examples, the fuel transaction verification system (100) may be a distributed system, meaning that components therein (i.e., the actual volume determiner (102), the recorded volume determiner (104), and the volume comparator (106)) are disposed at multiple locations. For example, at least one of the actual volume determiner (102), the recorded volume determiner (104), and the volume comparator (106) may be disposed on a vehicle such as a semi-truck. As a specific example, the semi-truck may include the actual volume determiner (102) which is coupled to a fuel level sensor within the semi-truck fuel tank. Still in this example, the other components, such as the recorded volume determiner (104) and the volume comparator (106), may be disposed at a location remote from the vehicle. Such a location may be a headquarters, or management facility of a fleet of vehicles. In this example, information collected by components disposed on a vehicle are transmitted to the remote location for fuel transaction verification. For example, when just the actual volume determiner (102) is disposed on the vehicle, the actual amount of fuel added is passed to the remote location. In a similar example, when the actual volume determiner (102) and the recorded volume determiner (104) are disposed on the vehicle, respective values are passed to the remote location for comparison.

In another example, each of the actual volume determiner(s) (102), the recorded volume determiner (104), and the volume comparator (106) are disposed on the vehicle. In this example, a determination of a discrepancy can be made at the point of sale such that immediate action may be taken, as opposed to sending the information off-site, i.e., away from the refueling station wherein a determination of a discrepancy is made. Such off-site determination may lead to a more complicated, after-the-fact resolution to the identified discrepancy rather than immediate resolution.

In another example, the fuel transaction verification system (100) may be entirely located at the remote location, i.e., headquarters or management facility. That is, the actual volume determiner (102), the recorded volume determiner (104), and the volume comparator (106) are at the remote location. In this example, fuel depth or other fuel level information from a fuel level sensor on the vehicle is passed wirelessly to the remote location, for example through a controller disposed in the vehicle. The actual volume determiner (102) at the remote location then receives the fuel level information (e.g., the initial and post fueling fuel level information) and determines corresponding volumes and a resultant amount of fuel added.

Still in this example, the recorded volume determiner (104) receives from the fuel provider, or the financial institution, a volume of fluid that is indicated as having been added to the fuel tanks. Doing such operations at a remote location as opposed to the vehicle ensures that the data is effectively transmitted to the entity of the organization best equipped to address the discrepancy. For example, a driver of a vehicle may be ill-equipped to notify a fuel provider of a discrepancy and doing so may affect his delivery. Accordingly, by off-loading this responsibility, the driver may continue his duties while allowing the fuel discrepancy to be addressed by fleet management personnel.

Thus, the present specification describes a fuel transaction verification system (100) that allows for a determination as to the accuracy of recorded fuel transactions such that 1) no funds are lost to a vehicle operator due to inaccuracy, or in some cases malfeasance, of the fuel provider equipment and 2) a vehicle operator may accurate record information on fuel use and consumption, which enhanced record keeping is essential for effective business operations.

Figure 2:
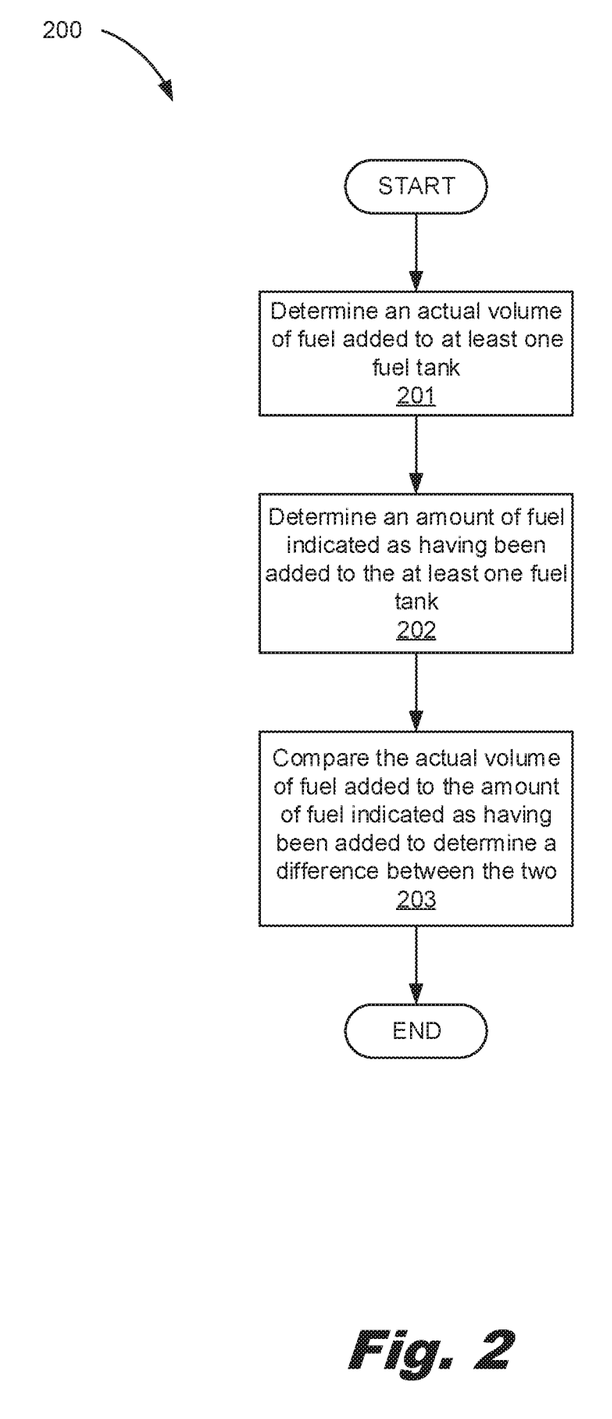
FIG. 2 is a flow chart of a method for fuel transaction verification, according to an example of the principles described herein.

FIG. 2 is a flow chart of a method (200) for fuel transaction verification, according to an example of the principles described herein. According to the method (200), an actual volume of fuel added to at least one fuel tank is determined (block 201). As described above, such a determination (block 201) may occur at a controller disposed on a vehicle on which the at least one fuel tank is disposed or may occur at a remote location. In either case, a fuel level sensor disposed within the fuel tank(s) indicates a level of fuel within corresponding fuel tanks both before and after a refueling operation. In the case where the actual volume of fuel added is determined (block 201) at a controller on the vehicle, these values are converted into respective volumes and subtracted from one another to determine (block 201) the actual amount of fuel added. In the case where the actual volume of fuel added is determined (block 201) at a remote location, either the initial and final fuel depths, or the initial and final fuel volumes, are transmitted to a remote location such as a fleet headquarters or other management facility.

Such a determination may be made in real time during a refueling operation. In some examples, the values determined at the vehicle are not presented to an operator. That is, the determined (block 201) amount of fuel added to the fuel tank is not displayed to an operator of the vehicle. Doing so may enhance the security of any fuel transaction verification operation.

The recorded amount, or the amount indicated as having been added, is also determined (block 202). As with the determination (block 201) as to the actual amount added, the determination (block 202) as to the amount indicated as having been added may be made either at the vehicle on which the at least one fuel tank is disposed, or at a remote location. If received at a vehicle, and the volume comparator (FIG. 1, 106) resides at the remote location, the controller of the vehicle may transmit this information to the remote location for comparison.

Also, as described above, determination (block 202) of the amount indicated as having been added may include receiving this amount from a third party, such as a financial institution or the fuel provider itself.

With these values known, a comparison (block 203) of the actual volume of fuel added with the amount of fuel indicated as having been added can be made and differences between the two determined. As with the above operations, the comparison (block 203) may be performed at the vehicle itself, thus providing point-of-sale information that allows for an immediate resolution, or may be performed at the remote location, thus leaving resolution of the matter to the fleet management personnel such that an operator of the vehicle may continue with his other responsibilities, thus not further delaying his deliveries.

Figure 3:
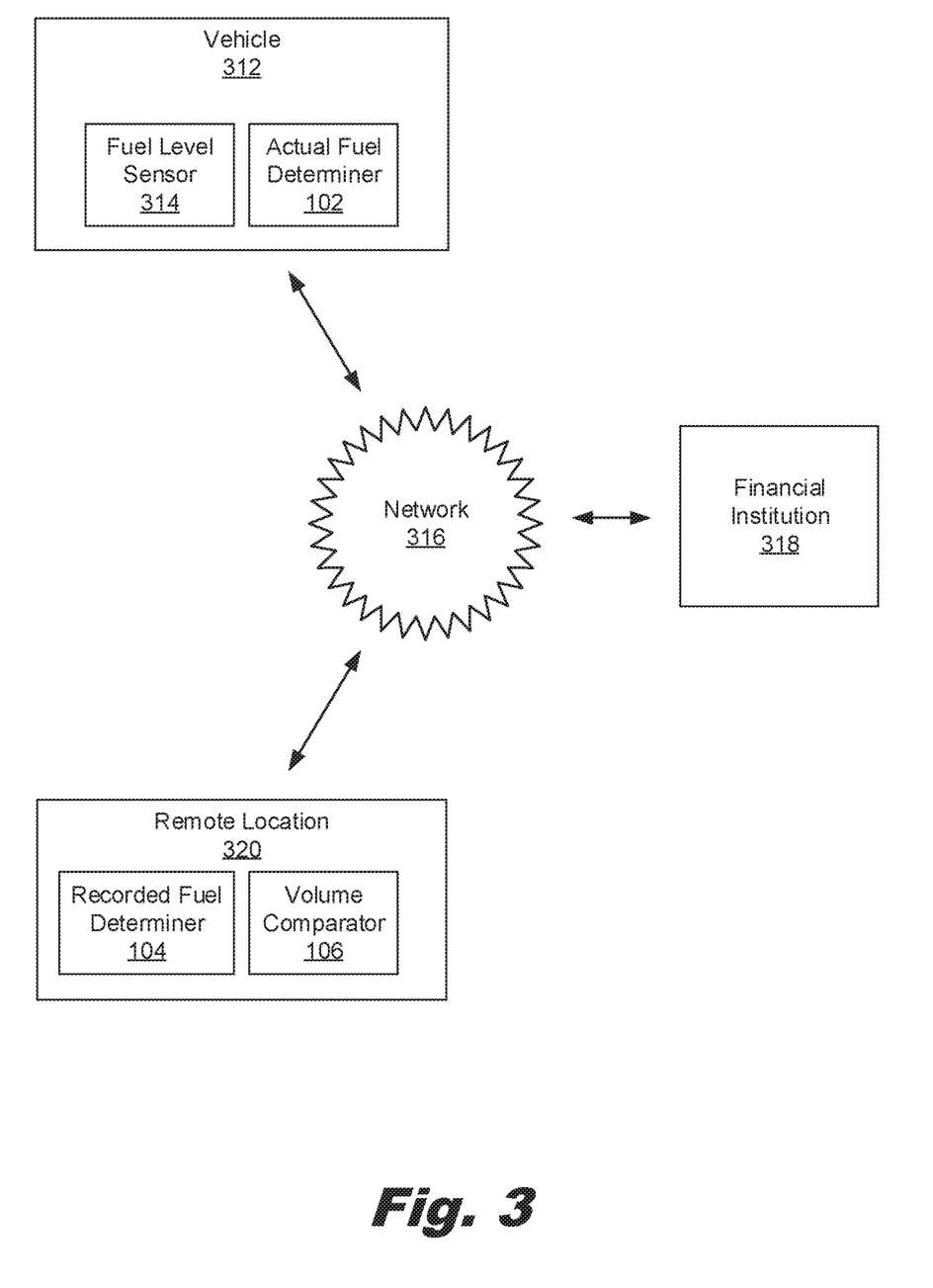
FIG. 3 is a diagram of an environment for fuel transaction verification, according to an example of the principles described herein.

FIG. 3 is a diagram of an environment for fuel transaction verification, according to an example of the principles described herein. As described above, the fuel transaction verification system (FIG. 1, 100) may be a distributed system with components at different locations. In the example depicted in FIG. 3, the actual fuel determiner (102) is disposed on a vehicle (312) at a refueling station to receive additional fuel. The vehicle (312) may be any type of vehicle including a consumer vehicle or a semi-truck vehicle (312) that is part of a fleet. Moreover, while specific reference is made to a vehicle (312), the principles described herein may apply to other pieces of equipment that run on fuel. In this example, the recorded fuel determiner (104) and the volume comparator (106) are at the remote location (320).

In this example, the various entities within the environment are communicatively coupled via a network (316) such as the internet. Via the internet, data can be transferred between the different entities. An example of the environment is now provided.

In this example, the vehicle (312) includes a fuel level sensor (314). The fuel level sensor (314) detects a level, or more particularly a depth, of fuel in the at least one fuel tank. The fuel level sensor (314) may be any type of sensor. For example, the fuel level sensor (314) may be a capacitive level sensor that includes a probe extending through a fuel tank. The capacitive level sensor measures a capacitance along a probe length and converts the capacitance into a depth of fuel in the fuel tank. For example, a fuel tank having a first level of fuel will result in a first capacitive reading and a second level of fuel will result in a second capacitive reading. In this example, either the fuel level sensor (314) or the actual fuel determiner (102) includes a database that includes a mapping between a detected depth of fuel and a volume of fuel within the at least one fuel tank.

In some examples the fuel level sensor (314) is wirelessly connected to the actual fuel determiner (102). This may be the case when the actual fuel determiner (102) is disposed on the vehicle (312) as depicted in FIG. 3, or when the actual fuel determiner (102) is located at the remote location (320). In other cases, the fuel level sensor (314) has a hardwire connection to the actual fluid determiner (102). In either example, a fuel depth value is sent via an electronic message path to the actual fuel determiner (102), which may be in the cab of the vehicle (312) or at the remote location (320). The actual fuel determiner (102) may convert the depth value to a volumetric reading, such as gallons. In this example, the volumetric reading is then passed (via the network (316)) to the remote location (320). Accordingly, during a refueling operation at a refueling station, the fuel level sensor (314) and the actual fuel determiner (213) are used to determine an actual amount of fuel added during the refueling operation.

At the conclusion of the refueling operation, an amount of fluid indicated as having been added is also transmitted to the remote location (320). Specifically, an output of the transaction, i.e., a sales receipt, is generated by a financial institution (318) at the point-of-sale. This information can be passed, via the network (316), to the recorded fuel determiner (104) at the remote location (320). Thus, both pieces of information, e.g., the actual amount of fuel added from the actual fuel determiner (102) on the vehicle (312) and the recorded amount of fuel indicated as having been added to the vehicle (312) from the financial institution (318) are at the remote location (320). Accordingly, the volume comparator (106) uses these two values to determine a discrepancy such that a remedial action may be carried out. Accordingly, a buyer of fuel may be notified that the fuel paid for (as indicated on the sales receipt) is not the same as the amount of fuel added to the tank (as determined from the actual fuel determiner (102)).

Figure 4:
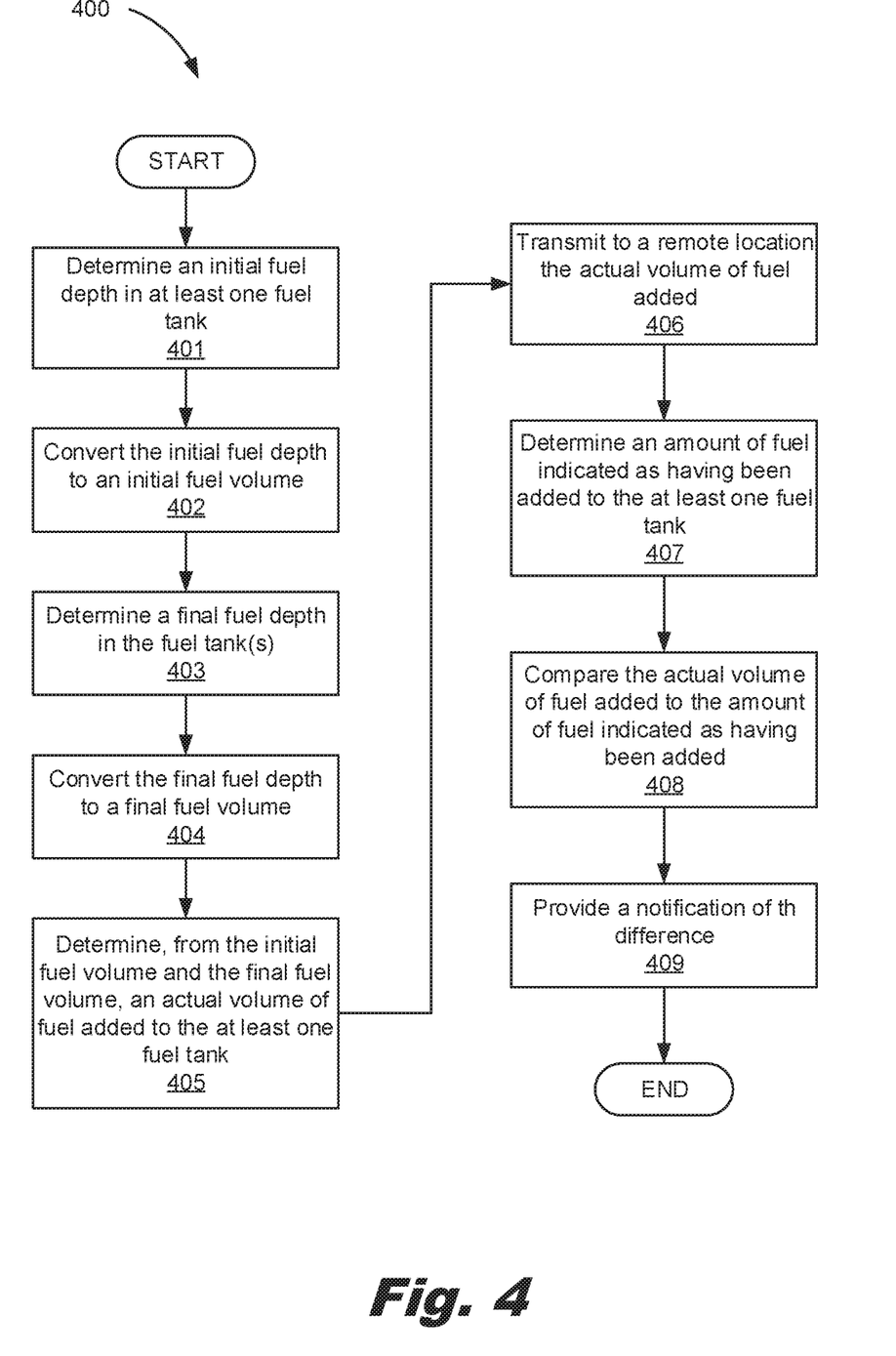
FIG. 4 is a flow chart of a method for fuel transaction verification, according to another example of the principles described herein.

FIG. 4 is a flow chart of a method (400) for fuel transaction verification, according to another example of the principles described herein. As described above, fuel transaction verification is determined from 1) an amount indicated as having been added, and presumably to have been paid for, and 2) an actual amount of fuel added. Accordingly, an actual amount of fuel added is determined. In some examples, this includes comparing a volume of fuel in a fuel tank before a refueling operation with a volume of fuel in a fuel tank following a refueling operation. Such volumes may be determined from fuel level sensor (FIG. 3, 314) measurements which may determine a depth of fuel in the fuel tank. Accordingly, an initial depth of fuel in a fuel tank is determined (block 401). In some examples this is done by mapping a capacitive output of a capacitive fuel level sensor (FIG. 3, 314) to fuel depth. The initial fuel depth is then converted (block 402) into an initial fuel volume. That is, either the fuel level sensor (FIG. 3, 314) or the actual fuel determiner (FIG. 1, 102) includes a mapping between fuel depth and volume. Such a conversion may be defined in part based on size and volume characteristics of a particular fuel tank. For example, a fuel tank with a first diameter may have a different mapping between depth and volume than a fuel tank with a second diameter, which second diameter may be larger than the first.

As described, this depth determination (block 401) and volume conversion (block 402) may be prior to a refueling operation. Similar operations may be carried out at the conclusion of a refueling operation. That is, a final fuel depth may be determined (block 403) based on a capacitive output and this final fuel depth converted (block 404) into a final fuel volume.

With initial and final volumetric amounts determined, an actual volume of fuel added to the fuel tank is determined (block 405). In some cases, this value is then transmitted (block 406) to a remote location. That is, a controller, or the actual fuel determiner (FIG. 1, 102) in the vehicle (FIG. 3, 312), transmits (block 406) the actual volume of fuel added to the at least one fuel tank to the remote location (FIG. 3, 320).

An amount of fuel indicated as having been added, and paid for by the operator of the vehicle, is then determined (block 407) and a comparison (block 408) made between this value and the actual amount added. Such a comparison indicates whether there is a discrepancy between what was indicated as having been added (which the customer paid for) and the actual amount added.

In some cases, a notification is provided (block 409) of the difference. Such a notification may come in a variety of forms. For example, the notification may be provided (block 409) to an operator of the vehicle (FIG. 3, 314). In such a case, an immediate resolution of the matter may be performed on site, immediately following the refueling operation. In another example, the notification may be provided (block 409) to the personnel at the remote location (FIG. 3, 320). Doing so may place the matter in the hands of management personnel equipped and trained to resolve such issues. Accordingly, the present specification describes a method (400) wherein an amount of fluid actually added to a fuel tank is compared against what a fuel provider indicates as having been added. Thus, discrepancies between the two can be addressed to ensure effective fuel usage by the operator of the vehicle.

Figure 5:
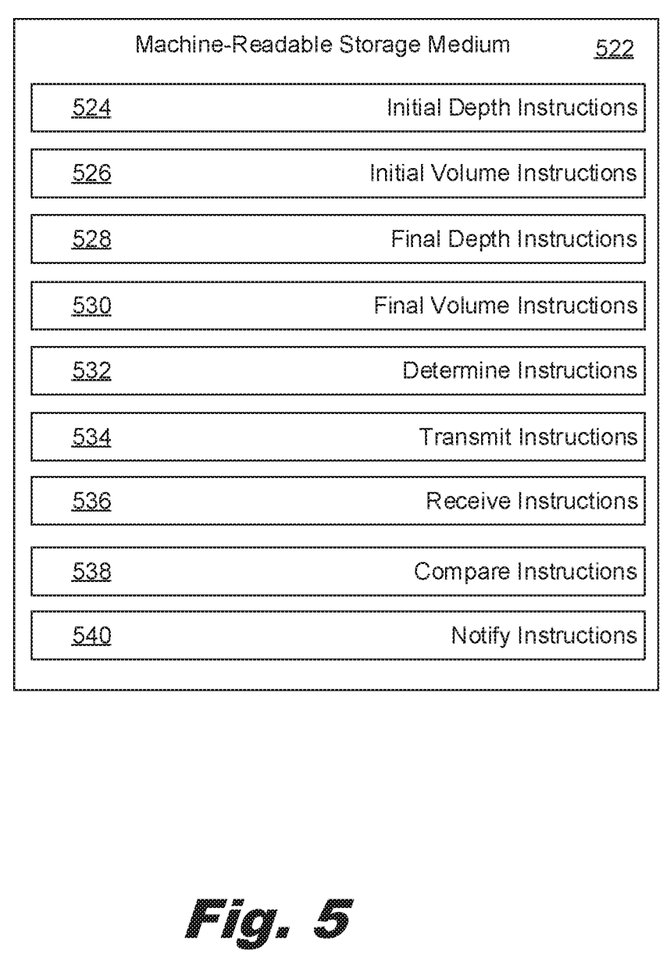
FIG. 5 is a diagram of a machine-readable storage medium for fuel transaction verification, according to an example of the principles described herein.

FIG. 5 is a diagram of a machine-readable storage medium for fuel transaction verification, according to an example of the principles described herein. To achieve its desired functionality, a computing system includes various hardware components. Specifically, the computing system includes a processor. Machine-readable storage medium (522) is communicatively coupled to the processor. The machine-readable storage medium (522) includes a number of instruction sets (524, 526, 528, 530, 532, 534, 536, 538, 540) for performing a designated function. The machine-readable storage medium (522) causes the processor to execute the designated function of the instruction sets (524, 526, 528, 530, 532, 534, 536, 538, 540).

Although the following descriptions refer to a single machine-readable storage medium (522), the descriptions may also apply to multiple machine-readable storage mediums. In such examples, the instruction sets (524, 526, 528, 530, 532, 534, 536, 538, 540) may be distributed (e.g., stored) across multiple machine-readable storage mediums.

The machine-readable storage medium (522) represents any tangible and non-transitory memory capable of storing data such as programmed instructions or data structures used by the computing system.

Referring to FIG. 5, initial depth instructions (524), when executed by a processor, may cause the computing system to determine an initial fuel depth in a fuel tank. Initial volume instructions (526), when executed by a processor, may cause the computing system to convert the initial fuel depth to an initial fuel volume. Final depth instructions (528), when executed by a processor, may cause the computing system to determine a final fuel depth in the fuel tank following a refueling operation. Final volume instructions (530), when executed by a processor, may cause the computing system to convert the final fuel depth to a final fuel volume. Determine instructions (532), when executed by a processor, may cause the computing system to determine, from the initial fuel volume and the final fuel volume, a volume of fuel added during the refueling operation. Transmit instructions (534), when executed by a processor, may cause the computing system to transmit, to a remote location (FIG. 3, 320), the volume of fuel added during the refueling operation. Receive instructions (536), when executed by a processor, may cause the computing system to receive, at the remote location (FIG. 3, 320), an amount of fuel indicated as having been added to the fuel tank. Compare instructions (538), when executed by a processor, may cause the computing system to compare the volume of fuel added with the amount of fuel indicated as having been added. Notify instructions (540), when executed by a processor, may cause the computing system to, when a difference between the volume of fuel added and the amount of fuel indicated as having been added is greater than a threshold amount, provide a notification of the difference.

In summary, using such a fuel transaction verification system and method 1) allows for increased information regarding fuel purchase and use for a variety of devices that consume fuel; 2) allows for more effective management of fuel purchase and use, and 3) notifies an equipment operator of issues relating to fuel purchase and use.

What is claimed is:

1. A method, comprising:
   determining an actual volume of fuel added to at least one fuel tank;
   determining an amount of fuel indicated as having been added to the at least one fuel tank from a refueling station;
   comparing the actual volume of fuel added to the amount of fuel indicated as having been added to determine a difference between the actual volume of fuel added and the amount of fuel indicated as having been added; and
   wherein determining an amount of fuel indicated as having been added to the at least one fuel tank from a refueling station occurs at a controller disposed on a vehicle on which the at least one fuel tank is disposed.

2. The method of claim 1, further comprising providing a notification of the difference between the actual volume of fuel added and the amount of fuel indicated as having been added.

3. The method of claim 1, wherein determining an actual volume of fuel added to the at least one fuel tank comprises:
   determining an initial fuel depth in the at least one fuel tank;
   converting the initial fuel depth to an initial fuel volume;
   determining a final fuel depth in the at least one fuel tank following a refueling operation;
   converting the final fuel depth to a final fuel volume; and
   determining, from the initial fuel volume and the final fuel volume, a volume of fuel added to the at least one fuel tank during the refueling operation.

4. The method of claim 1:
   further comprising transmitting, to a remote location, the actual volume of fuel added to the at least one fuel tank during the refueling operation; and
   wherein comparing the actual volume of fuel added against the amount of fuel indicated as having been added is performed at the remote location.

5. The method of claim 1, wherein determining an amount of fuel indicated as having been added to the at least one fuel tank comprises receiving, from a fuel provider, a record of the amount of fuel indicated as having been added.

6. The method of claim 1, wherein determining an actual volumeof fuel added to the at least one fuel tank occurs at a remote location.

7. The method of claim 1, wherein determining an actual volume of fuel added to the at least one fuel tank occurs at a controller disposed on a vehicle on which the at least one fuel tank is disposed.

8. The method of claim 1, further notifying an operator of the vehicle when the amount of fuel indicated as having been added does not match the actual volume of fuel added by more than a threshold amount.

9. The method of claim 1, wherein determining the actual volume of fuel added, determining the amount of fuel indicated as having been added, and comparing the actual volume of fuel added to the amount of fuel indicated as having been added are all performed at a vehicle having the at least one fuel tank.

10. A system, comprising:
an actual volume determiner to determine an actual volume of fuel added to at least one fuel tank; and
a recorded volume determiner to determine an amount of fuel indicated as having been added to the at least one fuel tank from a refueling station;
wherein the actual volume determiner comprises a fuel level sensor in the at least one fuel tank and a controller on a vehicle having the at least one fuel tank, the fuel level sensor being in communication with the controller; and
wherein the controller is to determine a volume of fuel in the at least one fuel tank before and after a refueling operation and to determine the actual volume of fuel added from a comparison of the volume of fuel in the at least one fuel tank before and after the refueling operation.

11. The system of claim 10, wherein the recorded volume determiner is configured to determine the amount of fuel indicated as having been added to the at least one fuel tank by receiving, from a financial institution, a record of the amount of fuel indicated as having been added.

12. The system of claim 10, wherein the recorded volume determiner that determines the amount of fuel indicated as having been added to the at least one fuel tank from a refueling station is located at a remote location and in communication with the actual volume determiner.

13. The system of claim 10, wherein:
the actual volume determiner determines an actual volume of fuel added to multiple fuel tanks; and
the recorded volume determiner determines an amount of fuel indicated as having been added to the multiple tanks.

14. The system of claim 10, wherein:
the system is a distributed system; and
the actual volume determiner and the recorded volume determiner are disposed at multiple locations.

15. The system of claim 14, wherein information collected by components disposed on a vehicle are transmitted to a remote location for fuel transaction verification.

16. The system of claim 10, wherein the fuel level sensor is wirelessly connected to the controller of the actual volume determiner.

17. The system of claim 10, wherein the fuel level sensor is connected via a wire to the controller of the actual volume determiner.

18. The system of claim 10, wherein the actual volume determiner and the recorded volume determiner are both disposed on the vehicle.

19. The system of claim 18, further comprising a notification system to notify an operator of the vehicle when the amount of fuel indicated as having been added does not match the actual volume of fuel added by more than a threshold amount.

20. The system of claim 10, wherein the fuel level sensor is a capacitive fuel level sensor.

* * * * *